May 17, 1949.　　　　R. A. FRYKLUND　　　　2,470,244
ELECTRICAL REPRODUCING STYLUS
Filed Sept. 7, 1946　　　　　　　　　　3 Sheets-Sheet 1

INVENTOR.
R. A. FRYKLUND
BY
HIS ATTORNEY

May 17, 1949.　　　　　R. A. FRYKLUND　　　　　2,470,244
ELECTRICAL REPRODUCING STYLUS
Filed Sept. 7, 1946　　　　　　　　　　　　　　3 Sheets-Sheet 2

INVENTOR.
R. A. FRYKLUND
BY
HIS ATTORNEY

May 17, 1949.    R. A. FRYKLUND    2,470,244
ELECTRICAL REPRODUCING STYLUS
Filed Sept. 7, 1946    3 Sheets-Sheet 3

INVENTOR.
R. A. FRYKLUND
BY
*[signature]*
HIS ATTORNEY

Patented May 17, 1949

2,470,244

UNITED STATES PATENT OFFICE 2,470,244

ELECTRICAL REPRODUCING STYLUS

Robert A. Fryklund, Somerville, Mass., assignor to Submarine Signal Company, Boston, Mass., a corporation of Delaware Application September 7, 1946, Serial No. 695,571

6 Claims. (Cl. 323—51)

The present invention relates to means and method for automatically duplicating a desired shape or contour from a sample or template used for that purpose. The invention may be applied to machine shop use where an element or structure is to be copied and duplicated and also to general use.

The invention, for instance, may be applied to duplicating any regular or non-regular form such as cams, machine elements, pattern plates, keys or other machine parts and other articles of manufacture.

The invention has general utility and may be used for duplicating contours which have practically any shape. In the present invention, if the direction of feed is in a horizontal plane the tracer or duplicator head will move over the template in an up and down direction following accurately the pattern of the template to which the cutting head is associated.

An object of the present invention is to provide an indicating mechanism which will be extremely accurate and can be used for accurate machining purposes. In this connection an electronic or electrodynamic means is employed in which up and down components are opposed to each other in a circuit in which the horizontal direction of travel is a balance between the two. The system is provided with a biasing downward component which must be of just sufficient magnitude to compensate for the upward thrust in producing a stable balance so that the tracer head will always bear with a uniform pressure against the template. The present invention may be used in connection with automatic or manual horizontal feeds or feeds in a direction substantially normal to the action of the device.

Figures 1, 1A:
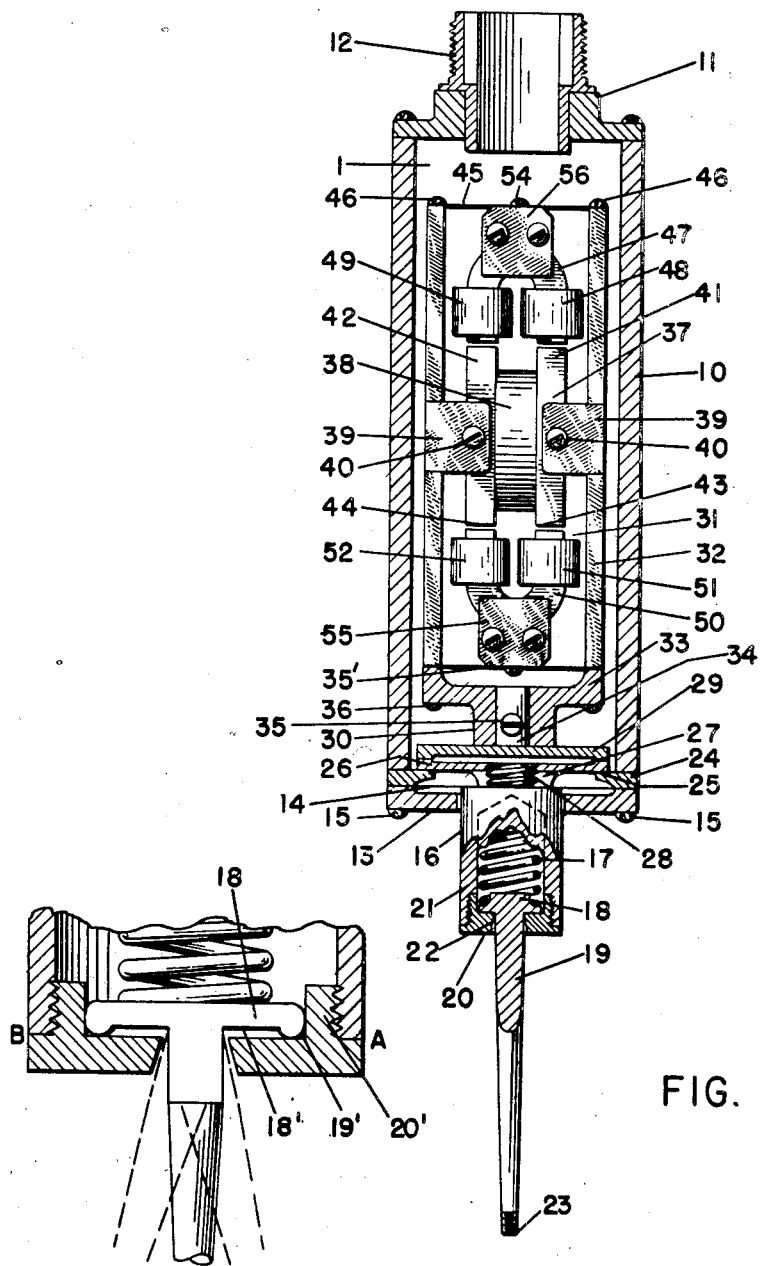
Figure 2:
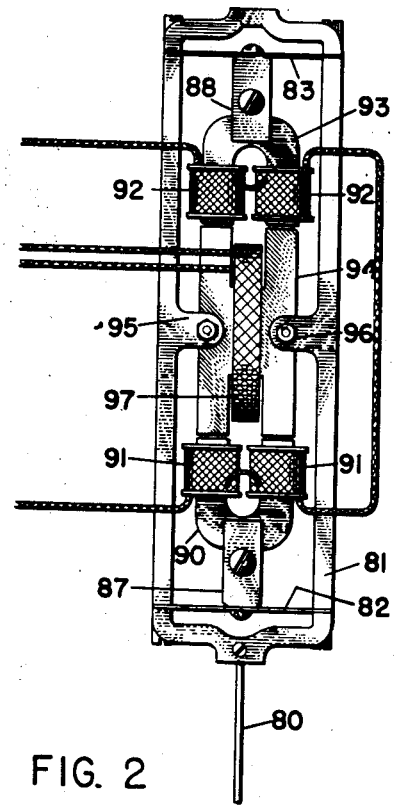
Figure 3:
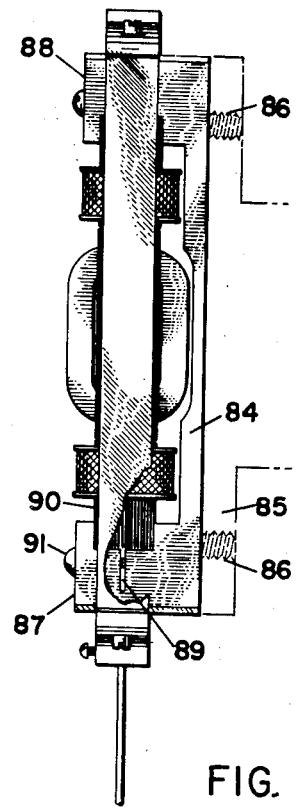
Figure 4:
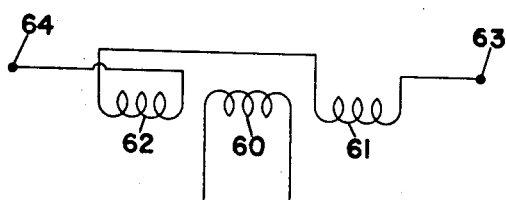
Figure 5:
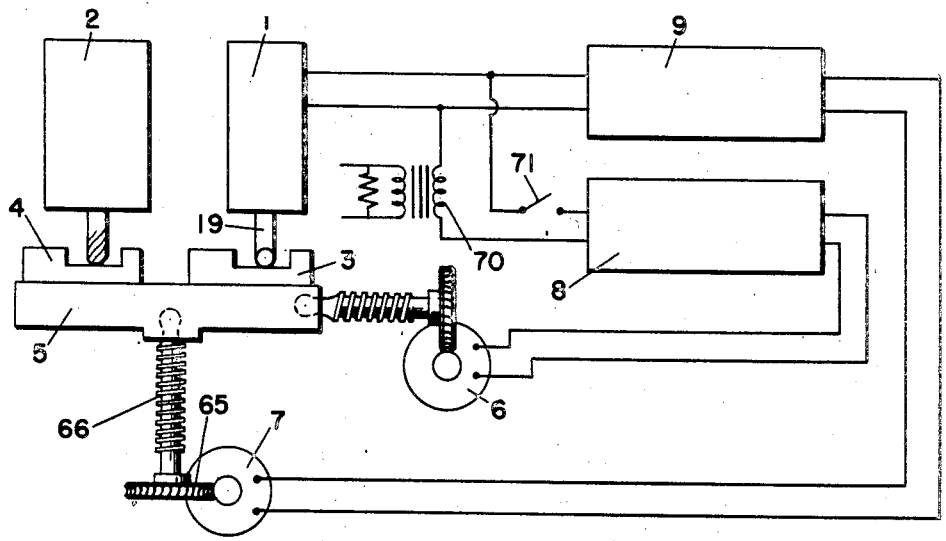
Figure 6:
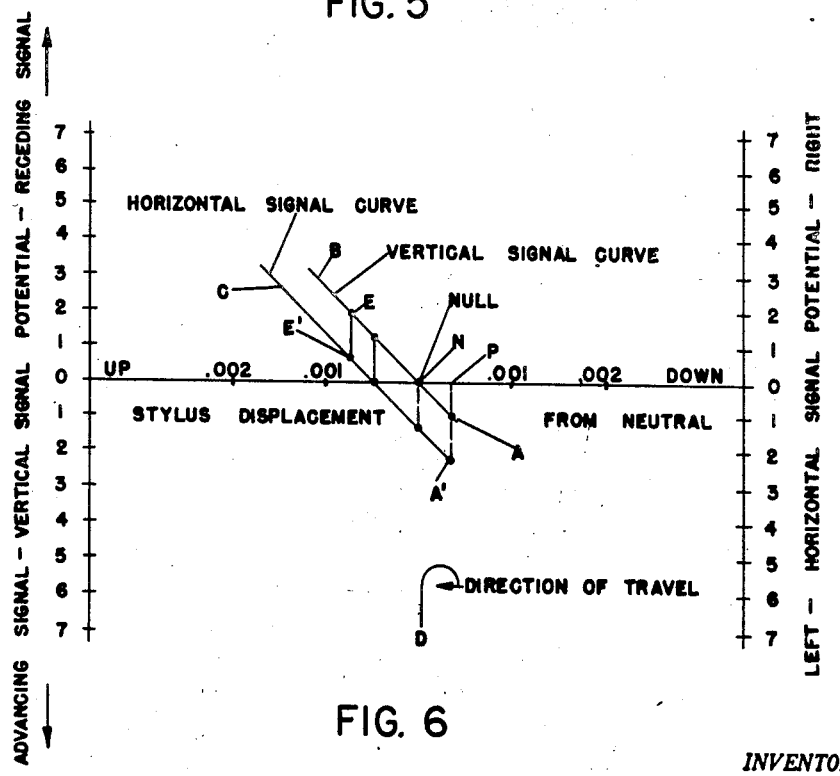

Without further dwelling on the merits or advantages of the present invention, the invention will be described in the specification below in connection with the drawings illustrating an embodiment thereof, in which Fig. 1 shows a central section through the duplicator or tracer head of the device; Fig. 1a shows a detail of Fig. 1 enlarged; Fig. 2 shows a modified form of the central unit of the device; Fig. 3 shows a side view of the device shown in Fig. 2; Fig. 4 illustrates an electrical connection of the units of Figs. 1, 2 and 3; Fig. 5 shows the electrical circuit diagram of the complete system; and Fig. 6 shows in diagrammatic form the operating characteristics of the system.

Referring first to Fig. 5 which shows the general system diagrammatically, 1 is the tracer head, 2 is the cutter head, 3 is the template which the tracer head follows and 4 is the work being cut. Both 3 and 4 are mounted on a horizontal bed 5 which is moved in a horizontal direction right or left by means of the motor drive 6 and vertically up or down by means of the motor drive 7.

Horizontal motor 6 may be operated through a horizontal control circuit 8 while the vertical motor 7 is operated through a vertical control circuit 9. The horizontal control circuit and motor will be omitted or rendered inactive when manual or other drive means are employed for horizontal motion. The tracer head 1 impresses its signal upon the vertical control circuit which in turn reacts to drive the motor 7 for moving the table 5 up or down as desired.

The tracer head 1 shown in Fig. 1 comprises a frame or casing 10 which may be a cylindrical tube capped by a top cover 11 having a sleeve 12 through which the electrical cables pass to the elements within the cylinder. The bottom of the cylinder is provided with a cap 13 which clamps, across the end of the cylinder, a diaphragm 14 by means of clamping screws 15 distributed around the periphery of the cover 13. The diaphragm 14 has attached to it in its center portion a stylus holder 16 which is recessed to receive a helical spring 17 bearing against a flanged shoulder 18 at the end of the stylus 19, which projects through a threaded cap 20 screwed into the open end of the cylindrical case 21 of the stylus holder. A clearance is allowed between the stylus holder and the opening in the cap 13 through which it passes. It will also be seen that the cap 20 is provided with a tapered opening 22 tapering outward whereas the stylus 19 tapers inward so that a certain amount of play is given to the stylus for movement of the end 23 horizontally as well as vertically. The tapering stylus and the bottom face 18' of the flange 18 are clear of the inner face of the cap 20. The end of the flange 18 at 19' is rounded as shown in Fig. 1a and bears against the corner formed by the face of the cap 20 and inwardly extending cylindrical wall 20' threading into the cylindrical wall of the holder 16.

The diaphragm 14 is comparatively light and thin and permits, in addition to the motion permitted by the stylus mounting, substantially free motion of the stylus in a vertical direction. The stylus holder 16 has a threaded stud 28 extending upwards from its top surface, which stud passes through a central opening in the diaphragm 14 and screws into a projecting neck or boss 27 of a circular plate 26, thus clamping the stylus holder to the diaphragm 14 at its center. Between the clamping cover and the casing 10 there is held and supported a ring member 24 which is provided with an inwardly projecting flange 25 upon which the circular plate 26 normally rests.

An upper plate 29 lies in contact with the plate 26 about peripheral abutting faces, both plates 26 and 29 being recessed in their central sections so that they do not contact one another in this region. The upper plate 29 is provided with a projecting stud 34 to receive the electrical unit 31 which is supported in a frame 32 provided with a lower supporting yoke 33 to which the frame is attached. The stud 34 projects into the collar 30 and is fixed in place by means of a set screw 35 which provides a vertical adjustment for the stylus.

The frame 32 of the electrical unit and the yoke 33 acts to retain a spring bar 35' which is clamped at its ends between the frame 32 and the yoke 33 by means of the screws 36 passing through the end of the yoke 33. The frame 32 supports centrally an H-shaped laminated magnetic core 37 in which the cross bar of the core is surrounded by a coil 38 constituting the primary coil of the system. The core 37 is supported to the frame 32 by means of inwardly extending plates or brackets 39 to which the core 37 is held by means of the screws 40. The core 37 with its double set of poles 41, 42 at the top and 43, 44 at the bottom, together with the supporting frame 32, the lower yoke 33 and collar 30, form a comparatively rigid structure to which the upper circular plate 29 is adjusted axially up and down and also held firmly in place. The frame 32 also holds at its top a spring bar 45 which is clamped at its ends by the screws 46 to the top end of the frame 33.

Completing the magnetic circuit through the cross bar of the H-shaped core and the poles 41 and 42 is a U-shaped laminated magnetic core 47 which is provided with coils 48 and 49 surrounding its poles which face the pole ends 41 and 42 of the H-shaped core. At the lower end of the frame a similar U-shaped core 50 is provided with similar surrounding coils 51 and 52, completing the lower magnet circuit through the lower poles 43, 44 of the H-shaped core. The cores 47 and 50 are supported in a fixed position with reference to each other on a frame (see Fig. 3 for similar construction) as a unitary structure. The frame is affixed to the shell or cylinder 10 so that this remains stationary during movement of the rest of the head. The spring bars 35' and 45 are attached by screws 53 and 54 to the clamping units 55 and 56 respectively, so that in its normal inoperative position the U-shaped cores and the H-shaped core have their poles as shown in Fig. 1, spaced respectively from one another at a selected distance forming air gaps.

In the operation of the unit, the stylus 23, it will be seen, is free to move in vertical and in horizontal directions. The spring 17 acting in the recess of the stylus head 16 serves as a safety feature and does not begin to yield until pressures in excess of that for which the machine is to be used are applied and up to that limit the stylus assembly is a rigid unit. If the stylus end 23 is moved in a horizontal direction, the whole stylus holder moves with it in such a manner that the circular plate 26 pivots on the flange 25, thus raising vertically plate 29 which in turn raises the frame 32.

Since the U-shaped cores of coils are affixed to the case, the spring bars 35' and 45 flex as the frame 32 is pushed upwards against their restoring force, narrowing the upper gaps between the H and the upper core 47 and widening the lower gaps between the H and lower core 50.

The movement of the frame 32 will couple the coil 38 closer to the coils 48, 49 or 51, 52 depending upon the direction of motion of the frame. The coil 38 is supplied with alternating current and initially the coils 48, 49 are balanced against 51, 52 so that no net voltage results when the system is in balance.

The circuit connections for the coils 48, 49 and 51, 52 are shown in Fig. 4 where 60 corresponds to coil 38 and 61, 62 correspond each to a pair 48, 49 and 51, 52 respectively. Coils 61 and 62 are connected in series opposing with respect to one another, one being connected in the same phase with coil 60 and the other in opposition to it.

When the frame 32 is moved in either direction from a center position, a voltage will be induced across the terminal 63 and 64 the phase of which will depend upon the direction in which the motion of the frame takes place. In one direction the phase will be that of the alternating current across the coil 60 while in the other direction it will be 180° out of phase with this applied voltage. If the coil 60 is more closely coupled to the coil 62 and this is connected in the same phase, then the resultant voltage will be in the same phase. If however the coil 60 is more closely coupled with the coil 61 and the phases are reversed, then the resultant phase will be reversed.

The voltage developed across the terminals 63, 64 is impressed as indicated in Fig. 5 across the vertical control circuit 9 which is connected to operate the reversible motor 7 for raising or lowering the table 5 containing both the template and the work piece. Any desired means may be employed for the control unit 9. However, I prefer to use the type indicated in the copending application of William G. Gorton, Serial No. 599,988, filed June 18, 1945.

If the circuit of Fig. 1 in this companion application is used, the voltage developed across the terminal 63, 64 in the present case will be substituted for the synchro 8, the rotor 9 and the resistance connection across it of the Gorton application, the reduction gear 10 and the manual control being omitted. In this case the motor 1 of Gorton will be replaced by the motor 7 which operates the pinion 65 for turning the lead screw 66 of the table 5.

In the operation of the system, the upward travel of the table 5 will bring pressure to bear against the stylus 19 and move the frame 32 upward, thus tending to close the air gaps in the upper magnetic circuit and cause the coils 48, 49 to dominate the phase over those of 51, 52. This displacement will react to permit the motor 7 to be energized for rotation in such a direction that the table 5 will be brought downward until a neutral position has been reached.

A displacement diagram is indicated in Fig. 6 where the abscissae indicate relative stylus displacement from neutral and the ordinates indicate advancing and receding signal voltage on the left side of the sheet and corresponding right and left voltage signals for horizontal motion on the right of the sheet. The normal or neutral balance is obtained for the stylus 19 when it is under slight pressure acting upwards, that is to say, when the template exerts a slight bearing pressure on the stylus producing the desired displacement corresponding to a stationary position of the stylus.

Referring to Fig. 6 there are shown two signal curves, B the vertical signal curve, that is the character which governs the up and down motion of the stylus, and C, the horizontal signal curve which governs the right and left motion of the table or template and work. These curves are substantially parallel and preferably are straight or nearly straight lines. The point A on the vertical signal curve represents the furthest downward displacement of the stylus when no pressure is acting on the end 23. In this case the plate 26 is fully seated on the flange or ring 25. Under these conditions the vertical signal curve produces a signal voltage of 1 tending to advance the stylus in the direction of the work. This is of course accomplished by the work and template moving towards the stylus. This advancing movement of the stylus will continue until the null point N is reached on the vertical signal curve at which time the vertical signal voltage of potential is zero and no further up or downward movement of the stylus takes place. As indicated in the curves, this biasing displacement is equal to NP which is shown as something less than .001". If for some reason the stylus is displaced further in the upward direction from its neutral point, as for instance when the template forces the stylus further upwards, a receding signal voltage will be produced which will tend to drive the stylus and table away from one another. The tendency will be for the device to operate about the null point within a tolerance of less than .001".

In addition to the vertical displacement control, a horizontal travel control may be used which is coupled to the vertical control as indicated in Fig. 5. As has previously been stated, a horizontal control is applied to the motor 6 and takes its signal from the stylus operation the same way as the vertical control, with the addition however of a bias 70, the function of which will be described shortly.

The horizontal control device 8 is similar to the vertical device 9 and the motor 6 is operated in a manner similar to that of the motor 7.

For the explanation of the horizontal travel control, reference is now made to Fig. 6. When the vertical signal curve is operated with a displacement corresponding to the point A, at which no pressure is on the stylus, the horizontal signal curve is operated at the point A' corresponding to a left horizontal signal potential which will drive the work in the direction of the arrow D. This signal potential is obtained from the vertical signal potential plus the biasing horizontal potential which corresponds to the vertical distance between the points A and A'. When the vertical signal is zero and the stylus is at the null or neutral point N, then the horizontal curve still has the horizontal biasing potential and therefore the work and template move in the direction of the arrow D at a reduced rate. This is the normal operation of the system since the stylus tends to remain or operate at its neutral point. If, however, the stylus should come up against a sudden rise in the template or the contour over which it is tracing, then the vertical signal potential acting in the opposite direction to the horizontal bias will produce a zero horizontal signal voltage whereupon the horizontal travel will cease. Simultaneously the vertical signal voltage causes the stylus to recede in a vertical direction. If the vertical signal will rise to a point E, then the horizontal signal voltage will rise to a point E', in which case the direction of horizontal travel will be reversed and the motor 6 will drive the stylus away from the edge or side of the template which caused side displacement of the stylus. Simultaneously the vertical signal causes the stylus to recede from the work table so that in this way contours with overhanging features may be duplicated. The condition which makes the stylus and tool travel away from the work is reached where the contour is so steep that the velocity of travel existing at the moment in the direction of the arrow D will cause a vertical signal to produce a reverse travel signal on the horizontal motor. This is not only a safety measure to prevent the stylus from being broken but also permits contours to be followed accurately and automatically, the stylus and tool traversing over the contour and work, respectively, until the exact contour has been produced.

If it is desired, the horizontal control may be disconnected and manual control employed simply by opening the switch 71. In fact the switch 71 may be left opened until the stylus has been brought to the neutral position N on the curve B. In setting up the operation of the stylus and the work, after the work 2 and contour element have been placed in position, the vertical motor 7 is energized until the stylus is brought to the contour or template in its neutral position. At such a point the motor 7 would have stopped. If then the circuit for the horizontal control is closed, the motor 6 will operate and drive the tool and stylus in the direction of the arrow D, the stylus following the contour and producing advancing or receding signals which control upward or downward motion of the table 5.

In Figs. 2 and 3 substantially the same form of device is shown as in Fig. 1, except that the stylus 80 is rigidly fixed to the moveable frame 81 which is yieldingly and flexibly supported by means of the spring bars 82 and 83 to the supporting bracket 84 which may be attached to a frame 85, Fig. 3, by means of screws 86. This is shown in phantom in Fig. 3. The bracket support 84 carries, both at its upper and lower ends, clamping jaws 87 and 88. These clamping jaws, as indicated in Fig. 3, are slotted at 89 to provide a flexibility for holding the laminated core 90 which rests in a recess between the clamping jaws. A screw 91 passing through the front clamping face may be tightened to hold the laminated core firmly in place. The laminated core 90 corresponds to the core 50 of Fig. 1. Similarly each pole of the core 90 may be provided with coils 91, 91 connected in series with each other and with the similar coils 92, 92 around the poles of the upper laminated horseshoe core 93. The central H laminated core 94 is supported similarly as in Fig. 1 by two inwardly extending brackets 95 and 96. This core is also surrounded in its cross bar by coil 97 corresponding to the coil 42 at Fig. 1.

The arrangement in Figs. 2 and 3 is, as will be noted, a modified simpler construction than that of Fig. 1 but not as flexible, particularly in the method of supporting the stylus. The circuit of Fig. 4 applies equally to Fig. 2 in the case.

Having now described my invention, I claim:
1. In a system for reproducing the same relative motion between a work piece and cutter as between stylus and pattern, a stylus member, a supporting frame therefor including a flanged element and a supporting ring upon which the flanged element rests, an electromagnetic means comprising a coil and linking core and a pair of coil and core linking elements independently linking the first coil and core element, means supporting said first coil and core element by spring suspension from said pair, said means having a bearing element bearing against said flange, a pair of coil and core elements being suspended in fixed position with regard to said other coil and core whereby motion of the stylus will move said coil and core with respect to said pair.

2. In a system for reproducing the same relative motion between a work piece and cutter as between a stylus and pattern, a stylus member, a supporting frame therefor including a flanged element and a supporting ring upon which the flanged element rests, an electro-magnetic means comprising a coil and linking core and a pair of coil and core linking elements independently linking the first coil and core element, means supporting said first coil and core element by spring suspension from said pair, said means having a bearing element bearing against said flange, said pair of coil and core elements being suspended in fixed position with regard to said other coil and core whereby motion of the stylus will move said coil and core with respect to said pair, said pair of coils being connected in series opposing and means supplying alternating current to said single coil element.

3. In a system for reproducing the same relative motion between a work piece and cutter as between a stylus and pattern, a supporting frame providing an inwardly extending flange member at the bottom thereof, a diaphragm element supported across the bottom of the frame below said flange, a stylus member clamped centrally to said diaphragm and having a supporting plate bearing on the surface of said flange, a second bearing plate in face to face contact with the first plate, electromagnetic means having a relatively fixed portion and a moveable portion, spring suspension means supporting said moveable portion to said fixed portion, said spring suspension means also supporting said second bearing plate whereby motion of the stylus in any direction will provide relative motion between said portions of said electromagnetic means.

4. In a system for reproducing the same relative motion between a work piece and cutter as between a stylus and pattern, a supporting frame providing an inwardly extending flange member at the bottom thereof, a diaphragm element supported across the bottom of the frame below said flange, a stylus member clamped centrally to said diaphragm and having a supporting plate bearing on the surface of said flange, a second bearing plate in face to face contact with the first plate, electromagnetic means having a relatively fixed portion and a moveable portion, spring suspension means supporting said moveable portion to said fixed portion, said spring suspension means also supporting said second bearing plate whereby motion of the stylus in any direction will provide relative motion between said portions of said electromagnetic means, said last mentioned plate means being adjustably positioned with respect to its supporting member.

5. In a system reproducing the same relative motion between a workpiece and cutter as between a stylus and pattern, a cylindrical supporting frame having an inwardly extending flange at the lower end thereof, a stylus assembly projecting from the lower end of the cylinder in the direction of its axis, spring suspension means supporting said stylus in said cylinder including a plate member resting on said flange, a signal producing means having a portion thereof held in spring suspension with a plate member bearing against the upper surface of said first plate member, said spring suspension providing motion only in the direction of the axis of said cylinder.

6. In a system reproducing the same relative motion between a workpiece and cutter as between a stylus and pattern, a cylindrical supporting frame having an inwardly extending flange at the lower end thereof, a stylus assembly projecting from the lower end of the cylinder in the direction of its axis, spring suspension means supporting said stylus in said cylinder including a plate member resting on said flange, a signal producing means having a portion thereof held in spring suspension with a plate member bearing against the upper surface of said first plate member, said spring suspension providing motion only in the direction of the axis of said cylinder, said signal producing means comprising relatively fixed and moveable electromagnetic elements, one of said means being supported in a unified structure with said second plate.

ROBERT A. FRYKLUND.

REFERENCES CITED

The following references are of record in the file of this patent:

UNITED STATES PATENTS

| Number | Name | Date |
| --- | --- | --- |
| 1,771,551 | Strohschneider | July 29, 1930 |
| 2,111,643 | Salvatori | Mar. 22, 1938 |
| 2,395,525 | Wilkie et al. | Feb. 26, 1946 |
| 2,408,524 | Mestas | Oct. 1, 1946 |
| 2,410,295 | Kuehni et al. | Oct. 29, 1946 |